Jan. 19, 1965  I. JEPSON  3,166,005
AUTOMATIC EGG COOKER
Original Filed April 14, 1950
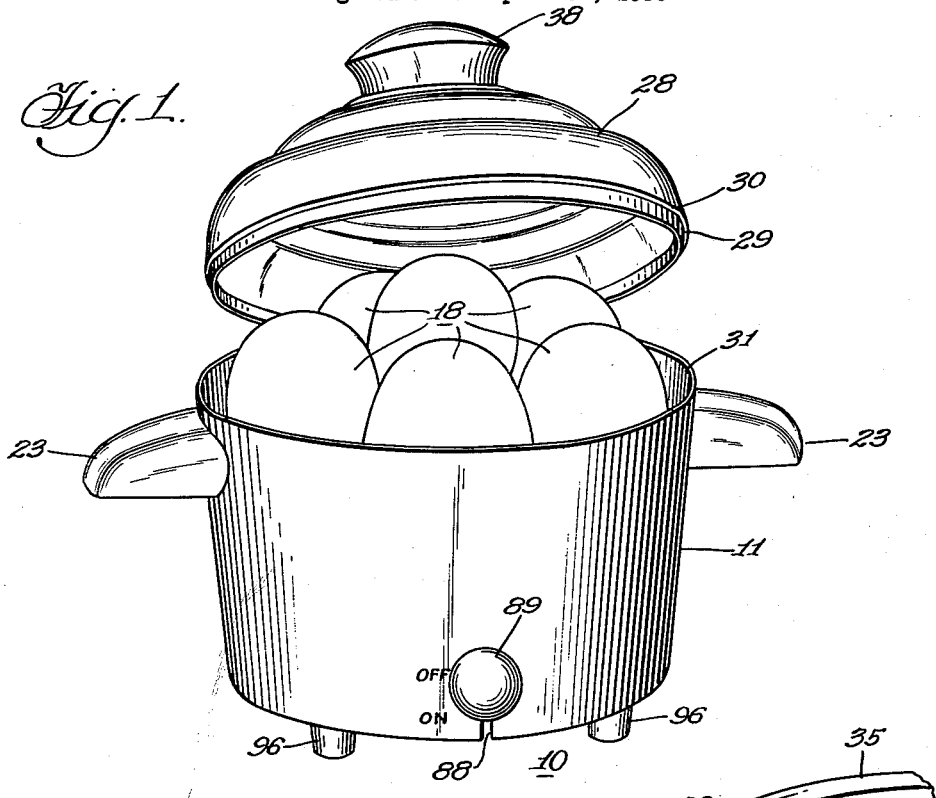
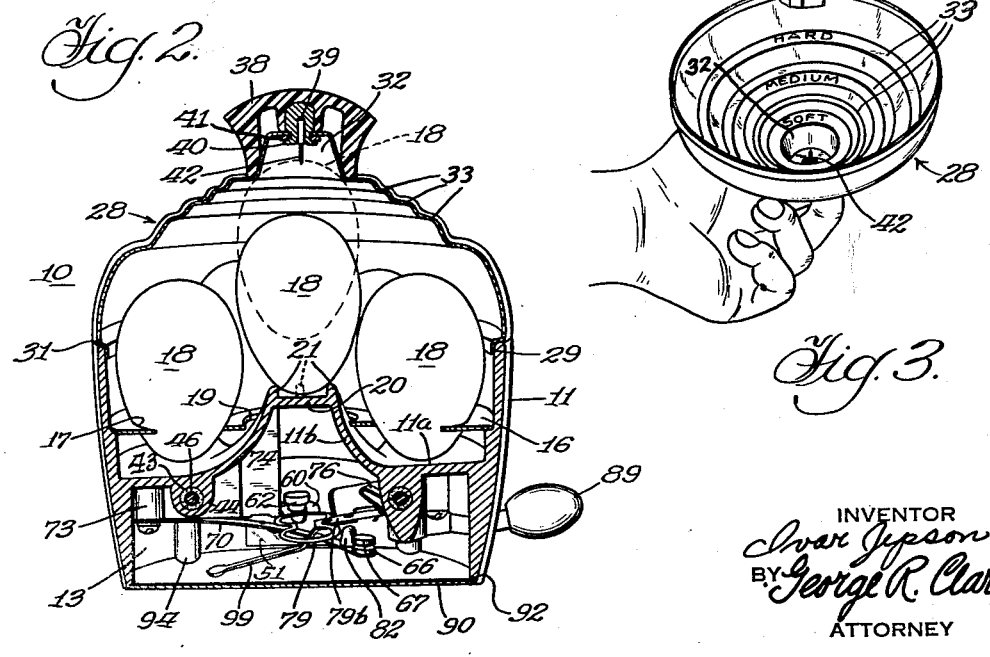
INVENTOR
Ivar Jepson
BY George R. Clark
ATTORNEY United States Patent Office 3,166,005
Patented Jan. 19, 1965

3,166,005
AUTOMATIC EGG COOKER
Ivar Jepson, Oak Park, Ill., assignor to Sunbeam Corporation, Chicago, Ill., a corporation of Illinois
Original application Apr. 14, 1950, Ser. No. 155,977, now Patent No. 2,761,375, dated Sept. 14, 1956. Divided and this application July 17, 1956, Ser. No. 598,363
3 Claims. (Cl. 99—440)

The present invention relates to an automatic cooking device and more patricularly to an automatic egg cooker. Specifically, this application is a division of a prior application, Serial No. 155,977, filed April 14, 1950, and assigned to the same assignee as the present application, now U.S. Patent No. 2,761,375.

Numerous devices have been heretofore proposed for automatically cooking eggs in a manner so the exact desired degree of cooking may always be obtained. Such prior art devices have been complicated, bulky and unwieldy and have not found favor with the housewife or other persons attempting to cook eggs. For use in a normal home, an egg cooker should be capable of cooking from one to six eggs at a time, and the device for accomplishing this purpose should be simple and compact so that it does not require a large storage space when not in use.

It is well known that eggs are conventionally kept under considerably different conditions at various times. For example, the housewife may desire to cook eggs by taking the eggs directly from a refrigerator so that the eggs themselves are originally at a relatively low temperature. At other times the eggs may be at room temperature or at times even at a more elevated temperature than room temperature. A satisfactory egg cooker should be capable of cooking such eggs to the desired degree regardless of the initial temperature thereof, and furthermore should be capable of repeating the process to produce the same finished product time after time. Such an egg cooker should furthermore have means for initiating operation thereof, after which it shuts itself off when the eggs are properly cooked without any further attention from the operator. In addition, the egg cooker should provide means whereby no cracking or damage to the eggs occurs during use. Although egg shells are capable of withstanding some 45 to 50 pounds of pressure per square inch, it is common practice in boiling eggs to have the shells break, whereupon the contents may spread throughout the cooking vessel causing a very difficult cleaning problem and being generally very undesirable.

Accordingly, it is an object of the present invention to provide an automatic egg cooker of pleasing design and appearance, including a cover having means for measuring various quantities of water to be employed to determine the ultimate end condition of the eggs, which design insures very accurate timing of the cooking interval even for short cooking intervals.

It is a further object of the present invention to provide a shell piercing needle in an automatic egg cooker positioned so that the shell of the egg may be pierced without other damage to the egg, to insure the escape of gas pressure which might be formed within the shell and thereby prevent breaking of the egg shell during cooking thereof.

It is another object of the present invention to provide an automatic egg cooker which will produce any desired degree of cooking of the eggs without any cracking of the egg shells regardless of the temperature of the eggs initially before being placed in the egg cooker.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings, in which:

FIG. 1 is a perspective view with the cover partially removed of an egg cooker embodying the present invention shown with the maximum number of eggs disposed therein for cooking;

FIG. 2 is a somewhat perspective sectional view taken through the egg cooker of FIG. 1 showing the eggs and the cover thereof in the normal position for a cooking operation; and FIG. 3 is a perspective view illustrating one step in the process of employing the egg cooker of the present invention.

The automatic egg cooking device of the present invention provides an arrangement whereby anyone and everyone can cook eggs to suit their own taste automatically and with every attempt. The degree of hardness or softness to which the eggs are cooked depends entirely upon the amount of water used. If the same amount of water is used every time, the eggs will be cooked exactly the same every time, whether the eggs are at room temperature to begin with or are taken directly from the refrigerator. The egg cooker comprises a receptacle having an inclined bottom and means for supporting a plurality of eggs in a minimum space. The egg cooker includes means for piercing each egg at the place where the air pocket in the egg is located to keep the eggs from swelling and cracking during the cooking operation. The cover includes measuring means for measuring the proper amount of water and when this water has all evaporated a thermostat responsive to the temperature of the lowest level of the inclined bottom of the receptacle cuts off the heating circuit. As long as any water is disposed over the thermostat, its temperature is limited to the boiling temperature of water, but upon evaporation of all of the water, the temperature rises rapidly to effect operation of the thermostatic control. Means for indicating the termination of the cooking operation are provided since obviously if the eggs are left in the cooker without opening or being cooled off, the heat stored within the eggs themselves will cause further cooking.

Referring now to the drawings, there is illustrated an egg cooker generally indicated at 10, which comprises a body 11, preferably formed of die cast aluminum or the like, which defines an upper cooking chamber or receptacle 12 and a lower mechanism or control chamber 13 separated from each other by a floor or wall portion 11a integrally cast with the body 11. As illustrated, there is provided within the upper chamber 12, a circumferential ledge 15 for supporting an egg locating disc 16 having a plurality of openings 17 defined therein for supporting or locating the eggs to be cooked such as 18, best shown in FIG. 2 of the drawings. The openings 17 are of such diameter as to receive only the small ends of the eggs, and the disc 16 is supported sufficiently above the floor 11a so that the eggs 18 do not touch this floor at any time.

For the purpose of supporting a maximum number of eggs in a minimum space whereby it is possible to maintain the diameter of the body 11 at a minimum, the disc 16 is provided with five egg receiving openings 17 arranged in a circle. In order to support a sixth egg, the floor 11a is provided with a raised central portion 20 integrally formed with the body 11 which is adapted to extend through a central opening 19 in the disc 16 when the latter is in position on the ledge 15. This raised central portion 20 further includes a plurality of integral upwardly extending prongs 21 for supporting the small end of a sixth egg in a sufficiently raised position so that the diameter of a circle running through the centers of the openings 17 may be maintained at a minimum. Thus, it will be observed by examining FIGS. 1 and 2 of the drawings that six eggs are disposed within a very small container by virtue of the fact that the sixth egg is supported centrally of the others and in a raised position so that the smaller diameter portion of the small end of this center egg is disposed between the other five eggs and the maximum diameter of this center egg is disposed above the line of maximum diameters of the other eggs. Preferably the raised platform or support 20 is united with the floor 11a of the body 11 by smoothly sloping somewhat conical shaped wall portions 11b to facilitate easy cleaning of the walls defining cooking chamber 12 upon removal of the disc 16.

For the purpose of handling the body 11, it is provided with handles 23 formed of molded plastic insulating material or the like. The handles 23 have a somewhat cup-shaped configuration with an arcuate end so as to conform to the shape of the body 11. Each handle 23 is tapped to receive a suitable screw or fastening means extending through the walls defining the upper chamber or receptacle 12. By virtue of the shape of the handles which conform to the outside configuration of the body 11, a single screw firmly holds each handle in place and twisting thereof is prevented.

For the purpose of limiting the escape of steam from the chamber 12 during the egg cooking operation, there is provided a cover 28 which has an integral peripheral flange 29 defining a ledge or shoulder 30. The peripheral flange is adapted to be received within the chamber 12 so that the ledge 30 rests upon the upper edge 31 of the body 11 as is clearly indicated in FIG. 2 of the drawings. In accordance with the present invention, the cover 28 serves several functions, among which is its function as a measuring device for measuring the correct quantity of water to be placed in the cooking receptacle or chamber 12 for conversion into steam during the cooking operation, the cooking interval being directly determined by the quantity of water employed. It will be understood that when eggs are to be soft boiled or cooked to only a minimum degree that a relatively small quantity of water is required. The smaller the quantity of water that is required to produce the desired cooking interval, the greater the accuracy with which this quantity must be measured to maintain the same percentage error in the desired length of this interval. Accordingly, the cover 28 is of cone shaped configuration with a plurality of steps defined by annular ridges 33. At the apex of the cone shaped cover there is provided a measuring receptacle 32 of small diameter for accurately measuring small quantities of water. Suitable indicia such as "soft," "medium" and "hard" are associated with some of the annular ridges 33 to designate roughly the cooking condition obtained with the particular quantities of water measured by the cover to the level of these associated ridges.

FIG. 3 shows the hand of an operator holding the cover 28 beneath a faucet 35. Depending upon the degree of cooking desired, a predetermined quantity of water is measured with the cover 28 and poured into the cooking chamber 12. Some people, of course, desire their eggs to be cooked harder or softer than the three specific conditions designated by the indicia "soft," "medium" and "hard" on the cover 28, and after using the cooker a few times, may find that a quantity of water between these levels or above or below these levels is most desirable for their taste. In any event, one may quickly determine how to cook the eggs to suit one's taste to perfection. Thereafter, if the eggs are desired to be cooked in the same manner, the same amount of water is measured, regardless of whether one egg or six eggs are to be cooked.

It will be understood that with a cone shaped cover having the small diameter portion 32 at the apex thereof, that any knob attached to the apex in the conventional manner would substantially increase the over-all height of the egg cooker 10. In accordance with the present invention there is provided a manipulating knob 38, which is hollow, as is shown best in FIG. 2 of the drawings, to receive completely therein the narrow diameter apex defining the measuring receptacle 32. For the purpose of holding the knob 38 in place on the cover 28, there is molded into the knob 38 a suitable insert 39 having a tubular extension 40 which may be peened over after insertion through an opening at the apex of the conical cover 28. A suitable washer 41 is preferably clamped between the peened over portion 40 and the adjacent surface of the cover 28 to insure against the escape of water when measured therein.

One problem always encountered in boiling eggs heretofore has comprised breakage of the egg shells by virtue of the pressure produced therein during the cooking operation with the resultant spreading of the contents of the egg throughout the cooking utensil and the creation of a rather undesirable odor, to say nothing of the difficulty of cleaning the egg cooker after each cooking operation. To prevent such breaking of the eggs, it has been suggested that the air pocket, which usually appears at the large end of each egg, be pricked by suitable means, thus affording an escape passageway for any gas or air pressure built up within the egg shell. To accomplish this there is provided, in accordance with the present invention, a piercing needle 42, which is suitably mounted as by a press fit within the insert 39 so as to extend into the cover 28 within the small diameter measuring section 32. With this arrangement, the shell of the egg may be pierced without otherwise damaging the shell since the diameter of the cover 28 near the needle 42 is such as to prevent more than a small portion of the egg to extend into the small diameter chamber 32. This is best shown by dotted lines in FIG. 2 of the drawings where it is noted that the shoulder defining the limits of the measuring section 32 of the cover 28 engage the egg shell and permit the piercing needle 42 merely to prick through the shell. Thus no further damage to the shell than the pricking of the small hole can occur.

For the purpose of supplying the necessary heat to cook the eggs, the automatic egg cooker 12 includes a suitable heating element, generally indicated at 43. Such a heating element is preferably one of the well known sheathed type heating units which conventionally comprises an outer metal sheath within which is disposed a suitable length of resistance wire such, for example, as Nichrome wire coiled in the form of a helix. Surrounding this coiled resistance wire within the sheath is a refractory composition indicated at 46 and commonly formed of fused magnesium oxide which centers the resistance element and which furthermore is a good heat conductor and yet a good electrical insulator. Preferably the sheathed heating element 43 is bent into the form of a substantially one turn ring having a diameter somewhat smaller than the diameter of the body 11. Also in accordance with the present invention, this ring comprising the sheathed heating element 43 is cast within a raised rib 44 during the casting operation of the body 11 with the rib 44 disposed in the control chamber 13. The ends of the sheathed heating element are preferably bent downwardly so that suitable rigid terminal portions defining each end of the resistance element extend in a substantially vertical direction and the fused magnesium oxide or other suitable insulation 46, which is already present in the sheathed heating element, provides the insulation for insulating the ends of the heating element from the conducting portions of the body 11.

In order to supply the heating element 43 with electrical energy in a controlled manner, there is provided a thermostatic control switch which is described and claimed in my copending divisional application, Serial No. 155,977, filed April 14, 1950. The thermostatic control switch and its associated power connections serve to terminate the egg cooking cycle when the temperature of floor 11a of the body 11 rises in temperature as a result of the water contained therein being entirely vaporized. The structure and mode of operation are completely described in my above-mentioned divisional application. Suitable elctrical terminals are associated with the egg cooker 10 so as to be capable of being electrically engaged by the female type plug of a conventional power supply cord which is furthermore adapted to be connected to a suitable electrical outlet.

For the purpose of resetting the thermostatic control switch when it is desired to initiate a cooking operation, there is provided a control lever 85 having one end projecting through a suitable slot 88 defined in the skirt of the body 11 bounding the chamber 13. Preferably the end of the control lever 85 is provided with a suitable control knob 89 formed of molded plastic or the like. Also, suitable indicia, such as "off" and "on" are preferably provided on the exterior of the body 11 adjacent the knob 89, as is clearly shown in FIG. 1 of the drawings, whereby the operator may know at a glance the operating condition of the egg cooker 10. To protect the thermostatic control mechanism and prevent the operator from coming in contact with the electric control circuit disposed within chamber 13, there is provided a suitable closure plate 90 adapted to seat on a ledge 92 defined around the inside periphery of the lower edge of the body 11. This plate is preferably attached by suitable fastening means which threadedly engages tapped openings defined in the body portion 11 during the initial casting operation. Preferably the same fastening means hold in position legs or feet 96 formed of a molded plastic material or the like. Thereby the egg cooker may be placed on any surface without damage to said surface from the heat stored in body 11.

In view of the detailed description included above, the operation of the egg cooker 10 of the present invention will be readily understood by those skilled in the art and no further discussion thereof is included. In initiating a cooking operation, the eggs taken either directly from a refrigerator or from some other place and are pierced by the piercing needle 42 at the large end thereof. Thereafter, the eggs are positioned by the locating disc 16, and if six eggs are to be cooked, the sixth egg is placed on the raised platform 20. Then the proper quantity of water is measured by the cover 28 and placed within the receptacle or chamber 12. The same amount of water, determined by the cooking interval desired, is used regardless of the number of eggs to be cooked. The cover is then placed on the egg cooker and the control knob 89 pushed to the "on" position. The latter step is preferably performed after the electrical cord, not shown, connected to the terminals of the egg cooker is connected to a source of electrical energy. The cooking of the eggs will then begin and if the eggs are cold, the evaporated water will condense coming in contact with the cold eggs without substantially any steam escaping until the eggs are heated so they no longer act as steam condensers. Thereafter, cooking continues with the steam escaping at the juncture between the cover 28 and body 11. When all the water is evaporated, the thermostat opens the circuit with a snap action which produces an audible signal indicating that the eggs should be removed to insure that they are cooked to exactly the right condition.

While there has been illustrated and described what is at present considered the preferred embodiment of the present invention, it will be understood that numerous changes and modifications will occur to those skilled in the art. It is aimed in the appended claims to cover all such changes and modifications as fall within the true spirit and scope of the present invention.

What is claimed as new and desired to be secured by Letters Patent of the United States is:

1. An egg processing device comprising a liquid holding cooking chamber, heating means for said cooking chamber for vaporizing a liquid to cook eggs therein, a cup-shaped cover for said cooking chamber, spaced indicia on the walls of said cover for indicating quantities of said liquid to be measured and placed in said chamber, an egg piercing needle mounted on the inside of the bottom of said cup-shaped cover, an annular shoulder on said cup adjacent said needle for limiting the entrance of said needle into an egg, and means for controlling said heating means in response to liquid contained in said cooking chamber, said heating means being de-energized when said liquid has been completely vaporized.

2. The egg cooking device of claim 1 wherein said cover is conical in shape and said annular shoulder surrounds a cup-shaped portion of relatively small and constant cross-section at the apex of said cover for measuring accurately small quantities of liquid.

3. A cover for an egg cooking device of the type in which the cooking interval is varied by placing varied quantities of water in said device, said cover being cup-shaped and forming a closure for a cooking chamber, circumferential ridges on the walls of said cover for indicating quantities of water to be placed in said chamber, an egg piercing needle mounted on the inside of the bottom of said cup-shaped cover, an annular shoulder on said cover adjacent the end of said needle limiting the entrance of said needle into an egg, said portion of said cover between said annular shoulder and mounting of said needle defining a receptacle for measuring small quantities of water, said receptacle completely enclosing said needle.

References Cited in the file of this patent
UNITED STATES PATENTS

| | | |
|---|---|---|
| D. 138,912 | Bye | Sept. 26, 1944 |
| 153,159 | Dinwiddie | July 21, 1874 |
| 615,238 | Barron | Dec. 6, 1898 |
| 826,843 | Gaillard | July 24, 1906 |
| 1,055,882 | Cubitt | Mar. 11, 1913 |
| 1,075,119 | Reichner | Oct. 7, 1913 |
| 1,486,374 | Gesell | Mar. 11, 1924 |
| 1,509,524 | Morrison | Sept. 23, 1924 |
| 1,887,592 | Goodfellow | Nov. 15, 1932 |
| 2,057,421 | Dickson | Oct. 13, 1936 |
| 2,062,182 | Kubitz | Nov. 24, 1936 |
| 2,093,013 | Jennings | Sept. 14, 1937 |
| 2,590,395 | Fry | Mar. 25, 1962 |

FOREIGN PATENTS

| | | |
|---|---|---|
| 858 | Great Britain | Jan. 12, 1907 |
| 248,554 | Great Britain | Mar. 11, 1926 |
| 262,260 | Great Britain | Dec. 9, 1926 |
| 270,105 | Great Britain | May 5, 1927 |
| 524,644 | Great Britain | Aug. 12, 1940 |